United States Patent [19]
Hofmann et al.

[11] 4,278,879
[45] Jul. 14, 1981

[54] SWITCHING ARRANGEMENT FOR RECORDING A VALUE-BALANCE

[75] Inventors: Otto Hofmann, Nuremberg; Georg Nagler, Oberwildenau, both of Fed. Rep. of Germany

[73] Assignee: Tele-Alarm, Nachrichtentechntehe Gerate GmbH, Fed. Rep. of Germany

[21] Appl. No.: 51,062

[22] Filed: Jun. 22, 1979

[30] Foreign Application Priority Data

Jun. 27, 1978 [DE] Fed. Rep. of Germany ....... 2828111

[51] Int. Cl.³ ..................... G06K 5/00; G06K 13/07; G06K 19/06
[52] U.S. Cl. .................................. 235/380; 235/475; 235/477; 235/493; 360/2
[58] Field of Search ............... 235/477, 449, 384, 493, 235/419, 488, 380, 475, 423; 340/149 A; 360/2

[56] References Cited
U.S. PATENT DOCUMENTS

| | | | |
|---|---|---|---|
| 3,836,753 | 9/1974 | Pass | 235/449 |
| 3,870,866 | 3/1975 | Halpern | 235/384 |
| 3,958,103 | 5/1976 | Oka et al. | 235/384 |
| 3,982,103 | 9/1976 | Goldman | 235/449 |
| 4,004,136 | 1/1977 | Torok | 235/449 |
| 4,020,325 | 4/1977 | Pfost et al. | 235/449 |
| 4,181,920 | 1/1980 | Cerekas | 235/449 |
| 4,185,730 | 1/1980 | Roes et al. | 235/449 |

*Primary Examiner*—Daryl W. Cook
*Attorney, Agent, or Firm*—Browdy and Neimark

[57] ABSTRACT

A switching arrangement for the recording of value balance information on a magnetic track disposed on a charge card. The arrangement is characterized in that a balancing circuit is connected to a reading-writing device with reading and writing heads and to a debiting circuit as well as to a balance recording device.

21 Claims, 1 Drawing Figure

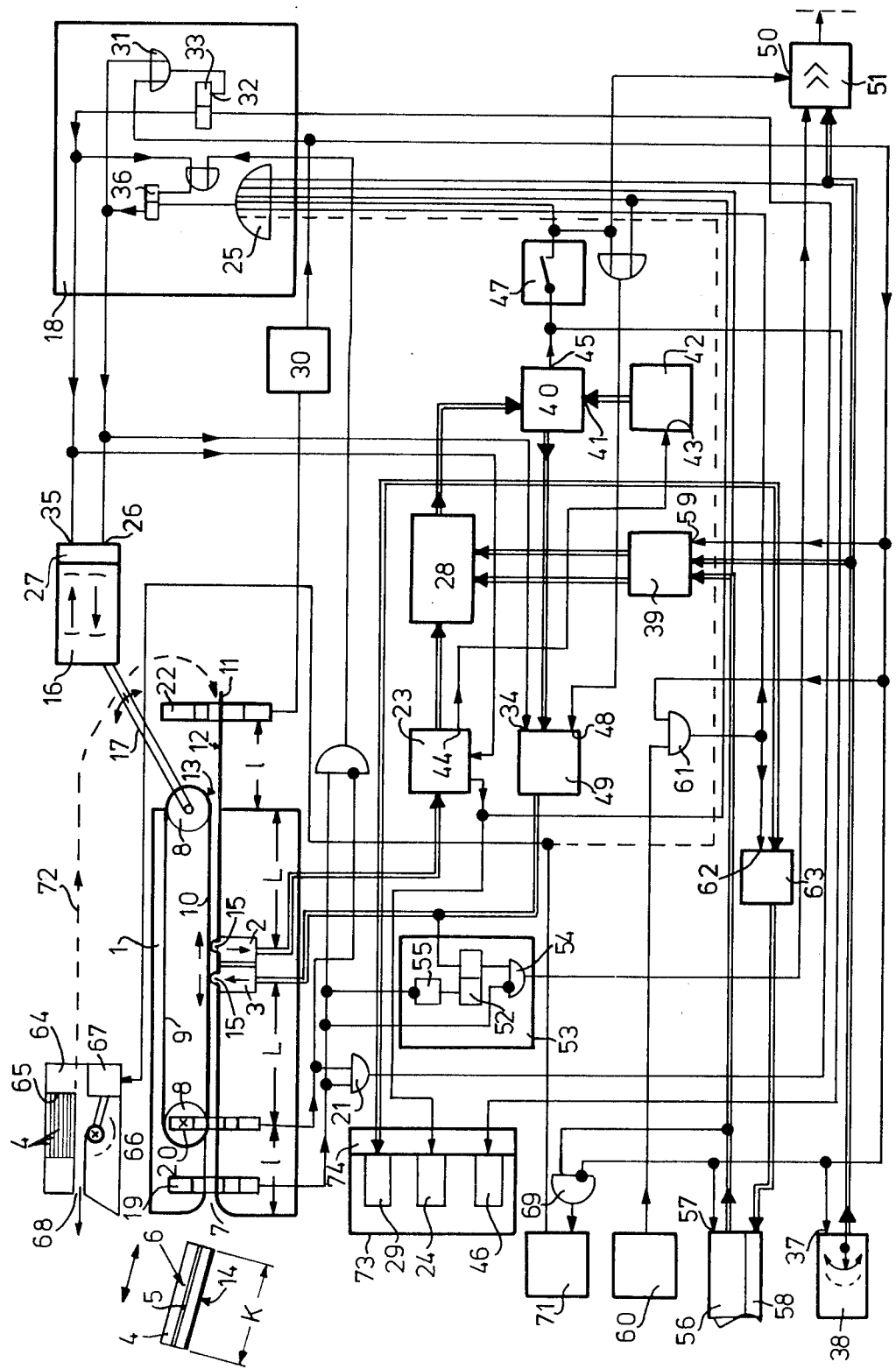

SWITCHING ARRANGEMENT FOR RECORDING A VALUE-BALANCE

FIELD OF THE INVENTION

The present invention relates to a circuit arrangement for recording a value-balance.

BACKGROUND OF THE INVENTION

Circuit arrangements for recording a value-balance are used, for example, in coin telephones of the more recent type in order to record the balance in the form of a remaining credit balance which results momentarily from the coin prepayment on the one hand, and the debit according to the measure of the time of conversation on the other hand.

Recordings of a balance are represented by the multi-trip tapes of tickets of public transportation which are issued for cash and are devalued according to the amount put on the transportation means, by section, while the number of the still valid sections represents the still available credit balance.

The present invention is based on the realization that it is bothersome in many areas of daily life to make use of the many services and goods of relatively small value, whenever a proper amount of fees—preferably exclusively in certain types of coins—is paid in. This is true, for example, in the large field of automatic vending machines or release for use in the service sector (locker installation, admission through revolving doors to exhibitions or baths). Beyond that it is a bother, for example, in case of sport activities, to have to carry change in order to rent sporting implements or to gain access to a shower or a sauna. Because of the outside temperatures and the special clothing it is particularly bothersome in case of winter sports to have exact change ready for the lift in a valley station. Also transition from one not yet completely used up ticket strip-section to a new ticket strip section in case of public transportation is bothersome, because the new ticket-strip is issued only against payment of a certain sum and the consideration of the residual balance on the old sectional strip-ticket in case of devaluation of the correspondingly decreased number of sections on the new ticket, may lead to errors.

SUMMARY OF THE INVENTION

It is therefore an object of the present invention to create a circuit arrangement of the initially cited type, by means of which practically cash-free use of offers of services and goods even of variable values is made possible.

This and other objects are accomplished according to the present invention by a circuit arrangement of the initially cited type characterized in that a balancing circuit is connected to a reader-writer device with reader and writer heads for a magnetic track disposed on a charge card and also to a debiting circuit and to a balance recording device.

For example in a sauna, in a coin laundry, in a cafeteria or a work canteen, for a self-serve copier or in a service station such a charge-card may be issued to interested parties, possibly against payment of a fee for a basic credit balance. Depending on the demand for massage or irradiation services in the sauna, of implements or soap dispensers in a coin laundry, of copying implements, of automatic goods dispensers in a cafeteria, or according to the measure of the quantity of fuel tanked, the balance hitherto contained on the magnetic tape of the charge card inserted into the reader-writer device, is reduced further, whereby the balancing may be made directly in money value or else by way of abstract value-units (value points) in case of only few different standard charges. Moisture proof, bending and abrasion-proof material on a plastic base may also be used for the charge-cards which will remain usable even under unfavorable conditions of use.

The preferred embodiment of the reader-writer device has the special advantage of being able to realize the reading-in of the charge card and the storing of the new balance with an easily triggerable electromechanical arrangement operating in a manner not susceptible to breakdowns.

An operation not susceptible to breakdowns in case of reading and newly describing the information on the magnetic tape of the charge card is still promoted by an effective further embodiment of the present invention.

A preferred arrangement of the reader and writer-heads and to the present invention, has the advantage that the rough surface of the conveyor belt will clean the active surfaces in the area of the stray filled slits of a charge card directly before and after gliding over the reader and writer heads.

A fork-coupler arrangement has the advantage of avoiding from the beginning any operational breakdowns based on the use of charge cards not intended, according to their format, for the reader-writer implements and of excluding at the same time any fraudulent action by duplicating a charge card with serial multiple information storage on its magnetic tape.

A progressive development in accordance with a further embodiment of the present invention ensures that the magnetic tape is read over its entire length or is written on again, and still no additional measures in circuit engineering are needed for drawing in or for the reversal of movement and for issuing of a charge card, because the corresponding reversal of the driving motor for the conveyor belt is accomplished by way of the fork couplers at a time, when the charge card, being processed, has not yet left the active segment of the conveyor belt.

A reader-head-writer arrangement, brings the particular advantage of being able to check directly an information transferred to the magnetic tract or to be able to still correct any information recognized as being incorrect, on the magnetic tape in the course of issuing the charge card.

An additional feature makes possible a control of the movement of the charge card during transition between evaluation of the present balance and storing in of the new balance, which from the point of view of circuit engineering is particularly inexpensive.

The evaluation of the output signals of the format fork couplers ensures that a determination and processing of the actual balance stored on the magnetic track is made only whenever the reader-writer device is fed with a charge card of such dimensions, which has been provided for processing in this device.

A progressive development ensures that the operation of the selector switch will lead directly to the selection of the services of goods offered for consideration of the resulting charge, thus for storage of the new balance on the magnetic track in the course of issuing the new charge card.

It may be effective for psychological reasons as well as for reasons of safety in regard to the dubious solvency of clients with charge cards, to trigger a signal upon reaching or dropping below a predetermined theoretical balance, in order to point out to the charge-card user the critical status of his account.

An additional feature guarantees that one may no longer drop below a predeterminable balance limit value by further operation of the selector switch, for example, because the credit risk would be too great. It may be effective particularly, to set the limit value at zero, therefore to terminate the availability of services and goods whenever an advance, (credit balance), for which the charge card was issued, is used up. Whenever the information stored on the magnetic track of the charge card contains a user identification, transferred again in case of the new balance removal from storage, it is even possible to design the circuit arrangement easily so, as to vary the terminal balance in accordance with criteria for the credit worthiness of the individuals introducing their charge cards into the reader-writer device.

An additional feature makes it possible to recover disposition of ones own charge card upon reaching the predetermined balance border value, by making a payment, say by inserting money in a coin checker and collector, according to the measure of the change of the actual balance in favor of the owner of the charge card. This new credit balance may then again be used up gradually, according to the operation of the selector switch and use of services or goods. This development is suitable especially however for the first availability of a charge card against payment of a basic predetermined or arbitrary amount.

A further development makes it possible to assign different values to individual services and goods, which need not be graduated in definite mutual ratios. For now the charges against the present balance are made entirely freely in the measure of desired performance for which a counter value is charged-off in a charge-circuit, which is transferred into the balancing circuit, loaded with the actual balance.

A further development is of particular practical significance, since in any case the inexperienced user of a charge card of the type referred to here may be tempted after operation of the selector switch and after seeing the new balance resulting from it to leave the reader-writer device in order to remove some goods or make use of some service without first having removed his charge card with the new balance stored on the magnetic track first. As a result of the fact that the release for example, of an access locking gate or of an opening flap of an automatic vending machine is accomplished only through the fact that the newly inscribed charge card is again removed from the reader-writer device, it has been ensured that the user will repossess his charge card prior to claiming the selected and already charged for goods or services.

A development makes possible an accounting for the final balance while issuing a credit, and erasure of the balance information on the magnetic tract of the charge card without the need of a personal effort.

Because of an additional feature, the circuit arrangement of the invention is also suitable for the original or first issuance of a charge card to an interested individual.

Such a new charge card may be provided with a zero balance or with an advance balance in favor of the interested party. The possibilities of use of the circuit arrangement of the invention are particularly flexible whenever an additional feature is realized wherein a charge card with a stored balance according, for example, to the availability sum of small change may be issued to the client, without there being any need for fitting amounts of money and/or types of coins.

Just because of the broad possibilities of applications there is provided an additional feature wherein not only a reference to the monetary balance and possibly the reaching of a limit balance, below which one might not go or to an attempt to obtain a service with a non-fitting charge card, is possible with the picture screen control. Rather the picture screen may also be used by way of electron-ray control circuits known as such for this purpose, for the showing of operating instructions and other pointers for the user.

According to an additional feature, it is centrally possible without great additional cost in respect to circuit engineering, to assign a circuit arrangement of the type of the invention to a multiplicity of different services and goods of different types and set different places and to put them at the disposal of any number of interested persons for their use with charge cards. Any expense for registerings and accountings with users are omitted completely, since the user is charged immediately on his charge card for making use of any offer, and to be sure within the scope of a past consideration which might again be replenished at any time by any amount or within the scope of a credit line that may be put in by way of a (negative) balance limit value.

The circuit arrangement of the invention thus makes it possible to replace the hitherto cumbersome and expensive cash payment accounting by a write-off system suitable for everybody in practically all fields of daily life, in the area of public as well as commercial services (libraries, means of communications, baths, sporting installations, service stations, cleaners) as well as in the goods sector, which with the except-of the temporary refilling of a credit balance by an arbitrary amount, that happens to be available is carried out entirely without cash.

BRIEF DESCRIPTION OF THE DRAWING

The FIGURE is a functional block diagram of a circuit according to a preferred embodiment of the invention.

DESCRIPTION OF PREFERRED EMBODIMENTS

Additional characteristics and advantages of the invention will result from the succeeding description of a preferred embodiment shown in a simplified manner, limited to essentials as a functional block diagram in the drawing.

Double lines represent communication buses for the transmission of (multi-bit) information, while single lines designate switching connections in the drawing for the transmission of control signals.

A reader-writer 1 with reader head 2 and writer head 3 has been designed to draw in or issue again a charge card 4 in the form of a card-shaped information carrier with a magnetic track 5 on the underside 6 and at the same time able to scan or to change information stored magnetically on the magnetic track 5. This information is binary coded and is stored preferably serially in the direction of the longitudinal extent of the magnetic track 5 several times in succession, so that the stored information will not be lost even if the charge card 4, for example, as a result of crease damage or other mechanical actions is shortened at one end or a part of the magnetic track should become ususable as a result of peeling of the card carrier material. For the transportation of the charge card 4, inserted into a transfer slit 7 within the reader-writer 1, there is an endless, belt shaped conveyor belt 9, guided around two reversing rolls 8, and made of a material which ensures that a constant length of the conveyor belt 9 is maintained independently of fluctuations in temperature which are to be expected. For insuring the tension of the conveyor belt 9, provision may also be made for shiftably disposing at least one of the reversing rolls 8 with respect to the position of the other and under the influence of a resiliently engaging force.

The active segment 10 of the conveyor belt 9 glides over the active surfaces of the reader head 2 and of the writer head 3 as well as over a guide support 11, over which the underside 6 of the charge card 4 seized by the conveyor belt 9 is pushed back and forth. The guide support 11 has a perspiration-free, smooth surface 12, which consists, for example as a result of a coating with a plastic plate, of a carrier layer, sodium cellulose papers, saturated with phenol resin, and of a cover layer of mobile sulfide cellulose papers or of another moisture resistant and abrasion resistant plastic coating, in order to insure that no mechanical or electrical breakdowns will occur during scanning of the magnetic track 5 in the course of the forward and backward movement of the charge card 4. The outside surface 13 of the conveyor belt 9 gliding away over the reader and writer heads, 2,3, is preferably roughened in order for the reader-writer 1 to securely grip, on the one hand, the top side 14 of the charge card during the reciprocal movement, and, unless a charge card 4 just happens to be guided past the reader and writer heads, 2, 3, to clean the active surfaces 15 of the reader and writer heads with the scrubbing movement.

A driving motor 16, whose direction of rotation is reversible has a mechanical rotary connection 17 with one of the reversing rolls 8, in order to put the conveyor belt 9 in motion for the drawing in or issuing of a charge card 4, depending on the control command delivered by a reversing logic 18.

A first format fork coupler 19 is disposed between the transfer slit 7, and the forward reversing roll 8, whenever a date-carrier card intended for the reader-writer 1 is introduced into the transfer slit 7, the first format fork coupler 19 detects without contact the width and possibly also the thickness of the charge card 4 introduced into the transfer slit 7 and delivers a starting signal whenever the corresponding measured values agree with predetermined values. Since in order to safely determine the data, the data stored on the charge card 4 are inscribed several times serially on the magnetic track 5, it would be possible in principle, to duplicate a charge card 4, admissable with regard to width and thickness, by halving it. In order to make sure that the reader-writer 1 is not fed an impermissibly shortened charge card 4, an additional format fork coupler 20 is disposed behind the first format fork coupler 19 in the longitudinal direction of the guide support 11 by a distance 1, which is somewhat smaller than the length K of the charge card 4, measured in the direction of the longitudinal extent of its magnetic track 5. An AND gate 21, therefore, will deliver a starting signal only whenever, in the course of drawing-in of charge card 4 by means of the conveying belt 9, a charge card 4 of predetermined geometry will be between the two format fork couplers 19, 20.

The distances L between the forward beginning of the active segment 10 of the conveying belt and the stray field slit as the active surface 15 of the writer head 3 or between the active surface 15 of the reader head 2 and the rear end of the active segment 10, are at least as large as the length K of the magnetic track 5 on the charge card 4. This will ensure that the totality of all data stored successively on the magnetic track 5, are scanned once by the reader head 2 or by the writer head 3 upon drawing in or issuing of the charge card 4.

The reader head 2 and the writer head 3, whenever dealing with separate construction units are disposed side by side in the direction of the active segment 10, and preferably such that the writer head 3 is positioned before the reader head 2 in the direction toward the transfer slit 7. This makes it possible in the course of drawing-in of a charge card 4, to inscribe information on the magnetic track 5 and as a control to read the stored information immediately back again. At the same time it is also possible as a result of this arrangement, to read and to process and immediately afterwards to change, for example, in case of finding mistakes the information stored in the magnetic track 5, in the course of the issuing of the charge card 4 from a rear reversing or waiting position to the transfer slit 7.

A return control fork coupler 22 is disposed at a distance C, which is somewhat smaller than the length K of the charge card 4, measured in the direction of the longitudinal extent of its magnetic track 5, behind the rear end of the active conveyor belt segment 10. The return control fork coupler 22 issues a signal whenever the charge card 4 has been completely drawn in over the reader head 2, but has not yet left the area tangent to it between the rear reversing roll 8 and the guide support 11.

This return control fork coupler 22, may also be more closely shifted to the reader head 2, whenever it cooperates with a switching arrangement for determining the drawing-in path of the charge card 4. It is important only that the charge card 4 will not leave the active segment 10 at its rear end, so that it may again be issued by reversing the driving direction of the conveyor belt 9.

The data, stored several times in succession on the magnetic track 5 of a charge card 4 represents a balance which may be positive (in favor of the card holder) or negative (debiting the card holder). A reader circuit 23 is series connected to the reader head 2, known as such from the magnetic tape storage technique. This reader circuit 23 contains effectively not only a control circuit for undisturbed recording of data, which may be based for example, on the evaluation of the successively stored identical data in the magnetic track 5, but in addition a circuit for decoding which will state whether or not the charge card 4 introduced into the transfer slit 7 is one assigned to the present unit. In case one of the criteria is not confirmed by the assigned control circuit within the reader circuit 23, a mistake recording 24 is triggered which transmits a corresponding warning to the operator and for example, asks him to introduce another charge card 4 (assigned to this reader-writer device 1 according to an imprint on the top side 14). In addition, the issuing control input 26 of a reversing circuit 27 for the driving motor 16 is triggered by way of an OR-gate in the reversing logic 18 and the driving motor 16 therefore is immediately reversed for the reverse direction of movement of the conveyor belt 9 for again putting out the wrong charge card 4, while locking a writer circuit 49.

In case none of the control circuits within the reader circuit 23 finds a faulty criterion, the balance data read from the magnetic track 5 are transferred to a balancing circuit 28, known per se from the cash-data technique. A balance recording device 29, series connected to the reader circuit 23, shows the user alpha numerically the balance on his charge card 4, for example, by way of recording tubes or a luminescent diode screen.

Whenever, on the basis of a charge card 4, which had been read and been pulled completely over the stray field slit of the reader head 2, the return control fork coupler 22 is triggered, it delivers a starting signal, for example, by way of signal forming circuit 30, series connected to it, via an OR-gate 31 to the reset input 32 of a bistable toggle stage 33 in the reversing logic 18, in order to stop the charge card 4 for the time being in a waiting position in the reader-writer device 1.

This bistable toggle stage 33 had been set previously by the starting signal of the AND-gate 21, in order to trigger the drawing-in control input 35 of the reversing circuit 27 for the driving motor 16 of the conveyor belt in case a permissible charge card 4 was present at the beginning of the active segment 10, and thereby to release the reader circuit 23 during the drawing-in movement of the conveyor belt 9. At the same time an issuing toggle stage 36 which may still perhaps be set, is reversed.

In the rearward waiting position between the return control fork coupler 22, now reached by the charge card 4, in which the driving motor 16 is switched off, a release signal is delivered to a release input 37 of a selector switch 38. By, for example, manual operation of this selector switch 38, the user of the unit, whose charge card 4 just happens to be momentarily in that rear waiting position, may make his selection between services or goods. The selection made is connected with a certain validity, which, coded in points or directly in some currency, is transferred from a debiting circuit 39 in a corresponding coded form as the starting signal of the reading circuit 23 to the balancing circuit 28. The latter determines the new, correspondingly decreased balance, which then appears on the balance recording device 29.

The new balance at the output of the balancing circuit 28, resulting from the charge, is further interrogated by a balance comparing circuit 40, to the comparing input 41 of which a limit-balance recorder 42 has been connected. The latter may be set for a desired positive remaining balance, which has a guarantee or security function in favor of the owner of the unit against the user or it may be set for a negative limit balance, depending on the credit position of the user, who, for example, may be individualized by an identification record within the scope of the coded information on the magnetic track 5. In the example shown, an adjusting input 43 on the limit balance recorder 42 is connected with a data output 44 of reading circuit 23, for changing the balance limit according to such information.

The limit balance recorder 42 may however also be set simply on the zero value in order to ensure for the operator of such a unit that the user will never have a negative balance.

In order to show the owner of the charge card 4, introduced into the reader-writer device 1, that he is about to drop below a predetermined balance limit which may also be shown on the recording device 29, an optical and/or accoustic signal generator 46 is triggered by the limit-value output 45 of the balance comparing circuit 40.

Whenever the operator of a unit with the switching arrangement of the invention will not permit any dropping below of the adjusted balance limit, then a blocking switch 47 series connected to the limit-value output 45 must be closed. A locking input 48 of a writer circuit 49 and a locking input 50 of a release mechanism 51 are series connected to blocking switch 47, and in addition, the toggle stage 36 for triggering the issuing control input 26 on the reversing circuit 27 of the driving motor 16 is set by the blocking switch 47 by way of the OR-gate 25. During the drive of the conveyor belt 9 for the return of the charge card 4 from its present rest position in the area of the return control fork-coupler 22, the reset input 32 of the bistable toggle stage 33 is triggered by way of the OR-gate 31, in order to make sure that no triggering of the drawing in control input 35 takes place also, simultaneously.

On the basis of the dominating effect of the locking input 48, again no activation of the writer head 3 takes place in case of this delivery movement of the charge card 4, so that no new charge is made, and the charge card 4 is reissued rather with the old balance, because the actual request by way of the selector switch 38 would have led to a drop below the balance-limit.

If however, the balance-comparing circuit 40 does not issue an output signal at the value-limit output 45, because a charge against the balance is admissible on the basis of the actual operation of the selector switch 38, this new balance, determined by the balancing circuit 28, is transferred to the writing circuit 49. In addition, the issuing toggle stage 36 is set by the selector switch 38 by way of the OR-gate 25, and therefore only the release input 34 of the writer circuit 49 is triggered simultaneously with the issuing control input 26 for reversing movement of the charge card 4 from its rest position in the area of the return control fork coupler 22. This balance information, possibly combined with re-transferred identity information regarding the used reader-writer device 1 or the person of the user, is written-in several times in succession into the magnetic track 5 by way of the writer-head 3, while the charge card 4 is pushed away over it, in order to reissue the charge card 4 at the transfer slit 7, showing the new balance.

Because of the triggering of the writer head 3 from the writing circuit 49, a bistable toggle stage 52 in a release circuit 53 is set, in order to prepare an inhibit gate 54. The latter however, will deliver an output signal only, whenever the returned charge card 4 has been taken from the first format fork coupler 19 and disposed directly behind the transfer slit 7. The toggle stage 52 will then be set back again after an adjustable delay time, by way of an inverting delay stage 55.

During this delay time, therefore after acceptance of the charge card 4 with a new, decreased balance, the operator of the selector switch 38 and owner of said charge card 4 may again make use of the selected services or goods, for example, he may approach a locker which had been released during the delay time by the release mechanism 51 for manual opening and removal of goods in consequence of triggering a magnetic door lock.

In order to raise the available balance again in case of approaching the balance limit or even dropping below it, advalorem tokens, say money, may be inserted into a collecting unit 56, while the charge card 4 persists in its waiting position in the area of the return control fork coupler 22, and therefore the release input 57 is triggered by way of the signal forming circuit 30. In case the release input 57 is not triggered, the inserted money, depending on the design of the collecting unit 56 may either be stored for the time being or else may be transferred directly to a coin release mechanism 58. In case the money is accepted, because the release input 57 is triggered and, for example, a coin checking mechanism in the collecting unit 56 does not deliver a contrary command, and the input 59 of the debiting circuit 39 is also triggered a reversal of the information from the collecting unit 55 for feeding into the balancing circuit 28 takes place, at the output of which there now appears the new balance, increased by the paid-in amount. At the same time, the setting of the issuing toggle stage 36 for triggering of the control input 26 takes place again by way of the OR-gate 25, i.e., the charge card 4 is moved foreward from its rear rest position in the direction toward the transfer slit 7, where by now the new more positive balance is written-in by way of the writer head 3 on the magnetic track 5.

A return guarantee key 60 is provided in order to have a possible positive balance on the charge card 4 paid out as far as available from the coin return unit 58, whenever the charge card 4 is read in and persists in the rear waiting position. The present balance therefore is lined up at the output of the balancing circuit 28 and thus, appears on the balance recording device 29. In case of operation of a return guarantee key 60, the release input 62 of a reversing circuit 63, series connected to the balancing circuit 28, is triggered by way of an AND-gate 61, series connected on the other hand to the return controlfork coupler 22, which reversing circuit triggers the coin-return unit 58 according to the accounted for plus-balance on the read-in charge card 4, while the outlet of the balancing circuit 28 is set back correspondingly. At the same time, the issuing control input 26 of reversing circuit 27 is triggered from the output of the AND-gate 61 via the OR-gate 25, and, in the course of the back movement of the charge card 4 over the writer head 3 to the transfer slit 7, the balance information on the magnetic track 5 is changed correspondingly as a result.

In order to issue a charge card 4 to a user who does not yet have a valid charge card 4 for this reader-writer device 1, a card dispenser 64 with a supply magazine 65, a delivery roll 66 disposed underneath it, a roll drive 67 and removal slit 68, has been provided. The charge cards 4, stacked in the supply magazine 65, may have a starting balance on their magnetic track 5 whenever a corresponding amount in value is inserted into the collecting unit 56, without there being a charge card 4 in the area of the return control fork coupler 22, and inhibit gate 69 is enabled which triggers a release input 70 of a requisitioning switch 71. Operation of switch 71 now releases the start of the roll drive 67 for issuing the lowermost charge card 4 from the supply magazine 65.

But provision may also have been made, as indicated in a broken line in the drawing, to make a charge card available in case of an advance payment at any level at the collecting unit 56 upon operation of the requisitioning switch 71, which card is then issued provided with the corresponding positive balance. For this purpose, the charge card 4 is not conveyed directly to a removal slit 68 from the supply magazine 65, but is presented by way of a mechanical reversing guide 72 at the rear end to the guide support 11 in order thereupon to provide its magnetic track 5 by way of the writer head 3 with the positive balance and to issue it at the transfer slit 7.

If a provision is to be made of recording only negative balances, then any coupling between the collecting unit 56 and the requisitioning switch 71 by way of the inhibit-gate 69 is superfluous, and a charge card 4 with a zero balance is issued at the removal slit 68.

It should be emphasized that the waiting position of a charge card 4 need not be located in the rear area of the reader-writer device 1, beneath the return control fork coupler 22, as is assumed in the drawing for simplification of the essential functional relationships. It may even be effective for special cases of use, after reading and transferring of the actual balance into the balancing circuit 28 and while erasing the contents of the magnetic track 5, to move the charge card 4 back immediately into the area of the format fork couplers 19, 20 and to let it persist here in a waiting position.

For the new writing-in of the new balance, such a reciprocal movement with final issuing by way of the transfer slit 7 likewise becomes necessary, which then however makes possible, for example, a realization of the already mentioned control possibilities by immediate reading of the data just newly inscribed on the magnetic track 5.

The balance recording device 29, an optical signal generator 46 and mistake recordings 24 may be combined functionally and presented, if need be, alpha numerically possibly together with the supplementing information for the user, whenever corresponding to the known use of data indicators, a picture screen device 73 with a symbol presentation circuit 74 is used, as indicated symbolically in FIG. 1. In order to realize the symbol presentation circuit 74, one may utilize generator circuits, known as such in cooperation with microprocessors, for the symbolic and/or alpha numerical data presentation especially whenever, in case of need and beyond the explained special recordings, the momentarily interesting part of an operating instruction, say in relation to the operation of the requisitioning switch 71 for a first issue of a card, with or without a positive balance may be presented on the picture screen device 73, so that an individual, not yet experienced in dealing with the switching arrangement of the invention and the corresponding reader-writer device 1, would not first leave to search for the corresponding part in an operation instruction displayed somewhere.

In the presentation in the drawing of the selector switch 38, consideration was given to the fact that it may assume different positions, which corresponds to a selection from among different goods and services offered at the same time. According to a corresponding code, the release mechanism 51 switches over to one of several possible issuing lines in order, for example, to release certain opening flaps of an automatic vendor for removal of some goods. Especially the reader-writer device 1 may be set up as a central unit, even for a multiplicity of spatially distributed apparatuses, responsive by way of the release mechanism 51, say centrally for several fuel dispensing columns connected thereto, or self-service copying devices. The criterion is merely, to make sure by spatial and temporal assignment, that the user, after removal of the charge card provided with the new balance may move to the place of the offer made, without anybody in the meantime making use, without permission, of the fact that the release mechanism 51 has already been triggered. Possibly, however, this triggering may not be provided only on the basis of the dimensioning of the delay stage 55 temporally limited, but may experience its triggering also only with a temporal delay predetermined according to the distances to be bridged over. In the meantime, another user may introduce his charge card already into the reader-writer device 1 and make his selection by way of the selector switch 38, while the release mechanism 51, after serving the first user, switches over to this newly selected offer. Only where a very busy public traffic prevails, as for example, at the entrance lock in the access to public transportation or spaces for performances, is it preferable to assign one single, fixed function to the selector switch 38 and to use a multiplicity of reader-writer devices 1 of the typed described. In this case it will be effective in order to avoid pile-ups, to omit card-issuing-requisitioning switches 71, return guarantee keys 60 or collecting and coin-return apparatuses 56, 58, for which then close-by a corresponding reader-writer device 1 with these possibilities is set up, which is used by the public then only in case of corresponding needs. In case of such a simplified embodiment, the charging circuit too may then be omitted, since no variable charges may occur any more.

The switching arrangement of the invention may however also be used to advantage in the cashier area of department stores etc., whereby then the selector switch 38 is operated by the cashiers or is replaced by a separate reader device for pricing labels removable from the goods. The charge card 4 then represents the individual credit card of the department store customer.

The determination and transfer of the balance in case of the practical realization of the switching arrangement of the invention just like the execution of the locking and control functions is not carried out via discrete circuits of integrated basic construction units of the digital circuit technique, but is realized with the use of a microprocessor with information and control storages connected with it, as known as such from the electronic data recording and processing, for example, in the engineering of electronic cash registers.

What is claimed is:

1. A switching arrangement for the recording of value balance information on a magnetic track disposed on a charge card, the arrangement comprising:
   a reader-writer device having reader and writer heads;
   a debiting circuit;
   a balance recording device;
   a balancing circuit connected to the reader-writer device to the debiting circuit and to the balance recording device;
   a reversible driving motor, the reader-writer device being coupled to the reversible driving motor and including a pair of reversing rolls;
   a guide support, the reader and writer heads being inserted into the guide support;
   a conveyor belt guided revolvingly on the reversing rolls and having an active segment slidably disposed on the guide support, the active segment having a forward beginning and a rear end; and
   a pair of format fork couplers disposed in front of the active segment of the conveyer belt and separated in the direction of the active segment of the conveyer belt by a distance (C) less than the length (K) of the charge card measured in the direction of the magnetic track of the charge card.

2. The switching arrangement recited in claim 1 wherein the guide support has a moisture-free, smooth surface and the conveyer belt has a rough outside surface of fixed length independent of temperature.

3. The switching arrangement recited in claim 2 wherein the reader and writer heads are disposed in the area of the active segment of the conveyer belt and project through the guide support and fit against the active segment of the conveyer belt.

4. The switching arrangement recited in claim 1 wherein the distance (L) between the forward beginning of the active segment and the writer head is at least as great as the length (K) of the magnetic track of the charge card; and the distance (L) between the reader head and the rear end of the active segment is at least as great as the length (K) of the magnetic track of the charge card.

5. The switching arrangement recited in claim 1 wherein the writer head is disposed in front of the reader head in the direction of the forward beginning of the active segment.

6. The switching arrangement recited in claim 1 wherein a return control fork coupler is disposed behind the rear end of the active segment of the conveyer belt at a distance (C) less than the length (K) of the charge card measured in the direction of the magnetic track of the charge card.

7. The switching arrangement recited in claim 6 including a reversing circuit having a release input series-connected to the return control fork coupler; a return guarantee key connected to the balancing circuit; and a coin return unit connected to the balancing circuit and to the reversing circuit.

8. The switching arrangement recited in claim 6 wherein the driving motor has an issuing control input; and including a reversing logic unit connected to the issuing control input, the return control fork coupler being connected to the reversing logic unit; a selector switch connected to the reversing logic unit; and a writer circuit connected between the balancing circuit and the writer head.

9. The switching arrangement recited in claim 8 including a collecting unit having a release input series connected to the return control fork coupler and wherein the balancing circuit and the reversing logic unit are series connected to the collecting unit.

10. The switching arrangement recited in claim 9 including a requisitioning switch; and a card dispenser series-connected to the requisitioning switch.

11. The switching arrangement recited in claim 10 including a mechanical guide for a charge card; and wherein the card dispenser is connected by means of the mechanical guide to the reader-writer device; and the debiting circuit and the requisitioning switch are connected to the collecting unit.

12. The switching arrangement recited in claim 8 wherein the selector switch has a release input series connected to the return control fork coupler; and the debiting circuit is connected between the balancing circuit and the selector switch.

13. The switching arrangement recited in claim 8 including a release circuit connected to one of the pair of format fork couplers and to the writer circuit; and a release mechanism series-connected to the release circuit.

14. The switching arrangement recited in claim 13 wherein the debiting circuit and the release mechanism are each series connected to the selector switch.

15. The switching arrangement recited in claim 8 including:
- a limit balance recorder;
- a signal generator; and
- a balance comparing circuit having a balance input series connected with the balancing circuit, a comparing input series connected with the limit balance recorder, and a limit value output series connected with the signal generator.

16. The switching arrangement recited in claim 15 including a picture screen device having a symbol presentation circuit series-connected to the balancing circuit and to the balance comparing circuit.

17. The switching arrangement recited in claim 15 including a blocking switch connected to the limit value output of the balance comparing circuit; and wherein the writer circuit has a locking input connected to the blocking switch; and the reversing logic unit is connected to the limit value output of the balance comparing circuit.

18. The switching arrangement recited in claim 7 wherein the driving motor has a drawing-in control input; and including a reversing logic unit connected to the drawing-in control input; an AND gate having an output connected to the reversing logic unit and a pair of inputs respectively connected to the format fork couplers; a reader circuit connected to the reader head; and a balancing circuit connected to the reader circuit.

19. The switching arrangement recited in claim 1 wherein the guide support has a substantially moisture-free, smooth surface.

20. The switching arrangement recited in claim 19 wherein said conveyor belt has a rough outside surface.

21. The switching arrangement recited in claim 1, wherein the reader and writer heads are disposed in the area of the active segment of the conveyer belt and project through the guide support and fit against the active segment of the conveyor belt.

* * * * *